United States Patent [19]
Kawabata et al.

[11] Patent Number: 5,646,803
[45] Date of Patent: Jul. 8, 1997

[54] ROTARY MAGNETIC HEAD DEVICE WITH HEAD BASE AND TRANSDUCER HAVING LINEAR EXPANSION COEFFICIENTS IN A SIMILAR RANGE

[75] Inventors: Kazunari Kawabata; Hisayoshi Chino, both of Kanagawa, Japan

[73] Assignee: Sony Corporation, Japan

[21] Appl. No.: 357,921

[22] Filed: Dec. 16, 1994

[30] Foreign Application Priority Data

Dec. 22, 1993 [JP] Japan .................. 5-324508

[51] Int. Cl.$^6$ ................................. G11B 5/592
[52] U.S. Cl. ......................... 360/109; 360/77.16
[58] Field of Search ........................ 360/84, 106–109, 360/125, 129, 130.22–130.24

[56] References Cited

U.S. PATENT DOCUMENTS

| | | | |
|---|---|---|---|
| 4,805,057 | 2/1989 | Ogawa et al. | 360/109 |
| 4,831,480 | 5/1989 | Takeda | 360/106 |
| 4,999,905 | 3/1991 | Kuriyama et al. | 360/129 |
| 5,036,419 | 7/1991 | Okauchi et al. | 360/109 |
| 5,103,361 | 4/1992 | Nagatsuka et al. | 360/109 |
| 5,126,906 | 6/1992 | Ohji et al. | 360/108 |
| 5,408,376 | 4/1995 | Nishikura et al. | 360/109 |

*Primary Examiner*—Jefferson Evans
*Attorney, Agent, or Firm*—Ronald P. Kananen

[57] ABSTRACT

A rotary magnetic head device in which the amount of protrusion of a magnetic head with changes in temperature is comprised within a pre-set range for assuring stable contact between the magnetic head and the recording medium. The head base (1) and the electromechanical transducer element (2) are formed of materials having the linear expansion coefficient in substantially the same range.

16 Claims, 4 Drawing Sheets

ROTARY MAGNETIC HEAD DEVICE WITH HEAD BASE AND TRANSDUCER HAVING LINEAR EXPANSION COEFFICIENTS IN A SIMILAR RANGE

BACKGROUND OF THE INVENTION

1. Field of the Invention

This invention relates to a rotary magnetic head device employed in a magnetic recording/reproducing apparatus, such as a video tape recorder. More particularly, this invention relates to an arrangement of an electro-mechanical transducer element supported on a head base of a rotary drum, each formed of materials having substantially the same coefficient of linear expansion. Still more particularly, this invention relates to such an arrangement which suppresses the protrusion of the head base and the transducer element to provide a stable abutment between them.

2. Description of the Related Art

When a magnetic head device is loaded on, for example, a video tape recorder, a mechanism for displacing the magnetic head is required because it is necessary to provide a tracking means to cause the magnetic head to follow a recording track for tracking during variable speed reproduction such as fast feed or slow reproduction tracking. As such a tracking means for causing the magnetic head to follow the recording track, an electro-mechanical transducing element, such as a bimorph, is employed. The transducing element is comprised of two polarized piezoelectric plates cemented together with a reinforcement plate of titanium, for example, interposed between the two piezoelectric plates.

As an example of the above-mentioned magnetic head device employing the above-mentioned electromechanical transducer element, a device disclosed in, for example, JP Patent Kokai (Laid-Open) Patent Publication No. 55-19393 (1980) has been proposed. The magnetic head device has its proximal portion secured to a head base made of an aluminum material for supporting an electro-mechanical transducer element near an end in a cantilevered fashion which has its distal or free end fitted with a magnetic head. The electro-mechanical transducer element is displaced when a driving voltage is applied to the transducer element for changing the position of the magnetic head carried at its distal end.

The magnetic head device has a control driving circuit for detecting the amount of displacement of the magnetic head and for changing the position of the magnetic head depending on the amount of such displacement. The control driving circuit includes a displacement amount detection circuit for detecting a change in resistance responsive to the amount of displacement of the transducer element from a strain gauge provided between the fixed proximal and free distal ends of the transducer element for functioning as a sensor. The control driving circuit also includes a bimorph driving circuit for applying a driving voltage to the transducer element.

An electromechanical transducer element, such as the bimorph element of two polarized piezoelectric plates cemented together is arranged on the head base, with a reinforcement plate of titanium interposed between the two piezoelectric plates. The rotary drum and the base head are formed of an aluminum material, and the electromechanical transducer element is formed of, for example, a piezoelectric ceramic material, as discussed above. The aluminum material and the piezoelectric ceramic material have linear expansion coefficients $\alpha_A$, $\alpha_c$ of $23.6\times10^{-6}$ and $6\times10^{-6}$ (l/C), respectively.

If the distance between the proximal fixed end and the distal free end of the cantilevered electromechanical transducer element is $s_1$, the length between the base head secured fixed end and the distal free end of the magnetic head is $s_2$ and the distance between the outer periphery of the rotary drum and the distal end of the magnetic head is H, a variation $\Delta H$ of the distance H caused with a temperature change $\Delta T$ is represented by an equation $$\Delta H = (s_1 \times \alpha_c - s_2 \times \alpha_A) \times \Delta T \tag{1}$$

as a function of the above-mentioned linear expansion coefficients. The variation $\Delta H$ is changed depending upon the temperature, as indicated by the formula (1). In effect, the variation $\Delta H$ represents a protruding amount of the magnetic head relative to the outer periphery of the rotary drum. It is apparent from the equation (1) that the variation $\Delta H$ indicating the amount of protrusion of the magnetic head is produced by the difference in the linear expansion coefficients of the respective materials of the component parts under the same temperature conditions dand environment.

If the amount of protrusion of the magnetic head is plotted against the drum temperature, the amount of protrusion of the magnetic head is $\Delta H_0$ and $\Delta H_{HI}$ for a drum temperature of 0° C. and higher than 60° C., respectively. If aluminum material and piezoelectric ceramic material are respectively employed, the amounts of protrusion $\Delta H_0$ and $\Delta H_{HI}$ are 50 to 60 µm and 10 to 20 µm, respectively. Consequently, a difference of approximately 40 µm is produced in the amount of protrusion of the magnetic head with a difference in temperature, wherein the amount of protrusion tends to be decreased with higher temperatures.

Such a difference in the amount of protrusion causes a differential abutment of the magnetic head with respect to the magnetic tape as a recording medium. That is, the magnetic head is receded with respect to the rotary head at higher temperatures so that the magnetic head is poorly abutted against the magnetic tape. Conversely, the magnetic head is protruded with respect to the rotary head at lower temperatures, thus causing damage to the magnetic tape under the effects of vibrations.

If the rotary drum is reduced in size, as in an extreme case as shown in FIG. 5, a length of the electromechanical transducer element is required from the fixed end for maintaining a sufficient amount of elastic deformation. If the requirement in length is met, and the distal end of the magnetic head 23 is arranged with a pre-set amount of protrusion on the rotary drum 28 as shown for example in FIG. 5, the magnetic head device is fixed on the rotary axis of the motor arranged at the center position of the rotary drum 28. With such a fixed position, the magnetic head device cannot be fixed on the disc of the rotary drum 28, with the result that the rotary drum 28 cannot be reduced in size.

Accordingly, it is a continuing problem in the art to provide a rotary magnetic head device with a proximal portion secured to a head base of a rotary drum for supporting an electromechanical transducer element in a manner in which protrusions of the magnetic head device with changes of temperature of the rotary drum continue to permit the head device to contact recording medium in a stable tracking manner.

BRIEF SUMMARY OF THE INVENTION

In view of the above-described status of the related art, it is an overall object of the present invention to provide a rotary magnetic head device in which the amount of protrusion of the magnetic head caused by changes in temperature are within a preset range in order to permit the magnetic head to contact stably with the magnetic recording medium.

The present invention provides a rotary magnetic head device comprising an electro-mechanical transducer element supported in a cantilevered manner by having its proximal end secured to a rotary drum at a raised portion of a head base as a mounting member, a magnetic head provided at the distal end of the electromechanical transducer element for displacing the magnetic head under a driving electrical voltage applied to the electromechanical transducer element, and a sensor provided between the proximal end and the distal end of the electromechanical transducer element for displacing the magnetic head under a driving voltage applied to the electromechanical transducer element for detecting the amount of displacement of the magnetic head. The head base and the electromechanical transducer element are each formed of materials having a linear expansion coefficient in substantially the same range.

The head base is secured to the rotary drum in the vicinity of the outer periphery of the rotary drum. The head base and the electro-mechanical transducer element are formed of ceramics or alloys having substantially the same linear expansion coefficients. Specifically, alumina ($Al_2O_3$), MoCu-based sintered alloys, mullite ($3Al_2O_3 \cdot 2SiO_2$), silicon carbide (SIC) and cordierite ($2MgO \cdot 2Al_2O_3$) are employed as the above materials.

With the rotary magnetic head device according to the present invention having the head base and the electromechanical transducer element formed of materials having substantially the same linear expansion coefficients, the amount of protrusion produced in the electromechanical transducer element is suppressed. This feature and characteristic assures a stable abutting contact between the magnetic head and the magnetic tape.

In accordance with the present invention, the head base is fixed to the rotary drum at a position in the vicinity of the rotary drum, thus avoiding a fixed mounting on the motor axis for assuring a pre-set length, i.e., a sufficient elastic deformation, in order to cause the magnetic had to follow the recording track. As mentioned, for such positioning, the head base and the electromechanical transducer element are formed of ceramics or alloys having substantially the same linear expansion coefficients in order to suppress the amount of protrusion of the magnetic head due to changes in temperature to 0.0045 um/° C.

DETAILED DESCRIPTION OF THE PREFERRED EMBODIMENTS

Figure 1A:
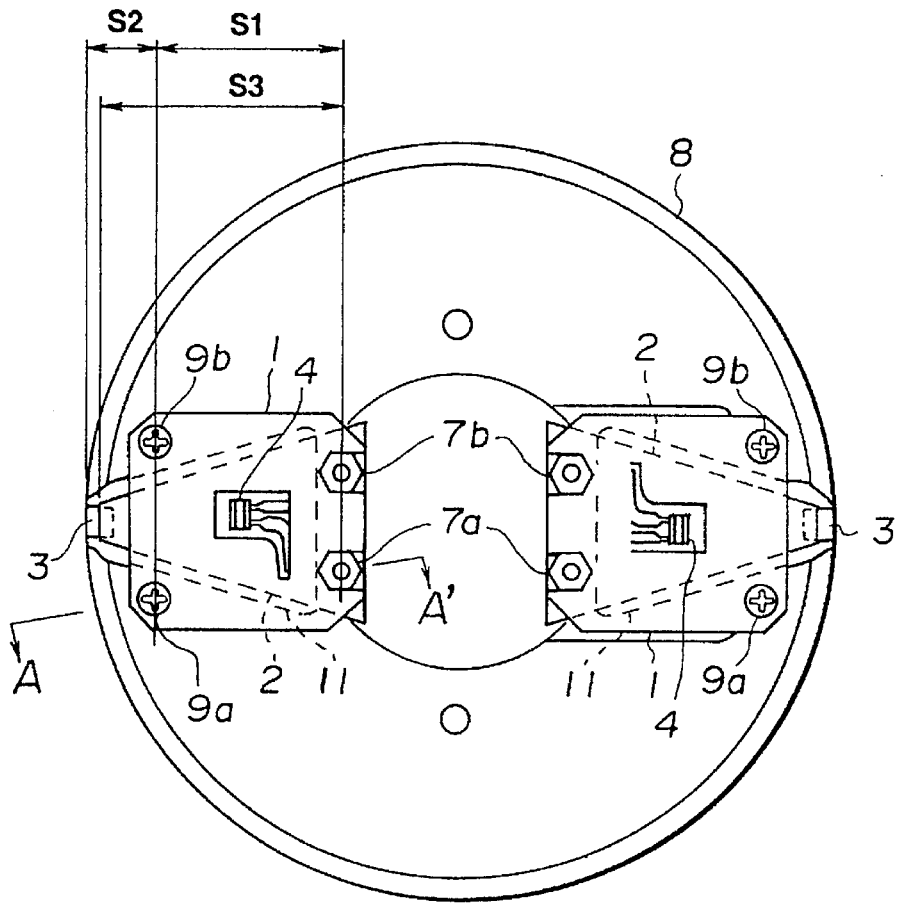
FIG. 1 is a plan view shown in FIG. 1(a) and a cross-sectional view show in FIG. 1(b) of a rotary magnetic head device according to the present invention, showing the state of mounting of a rotary magnetic head device on a rotary drum from a reverse side.
Figure 1B:
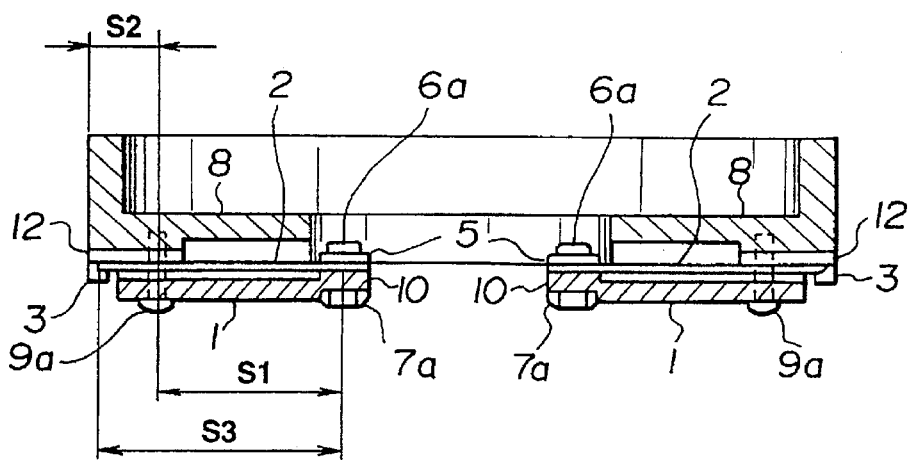
Figure 2:
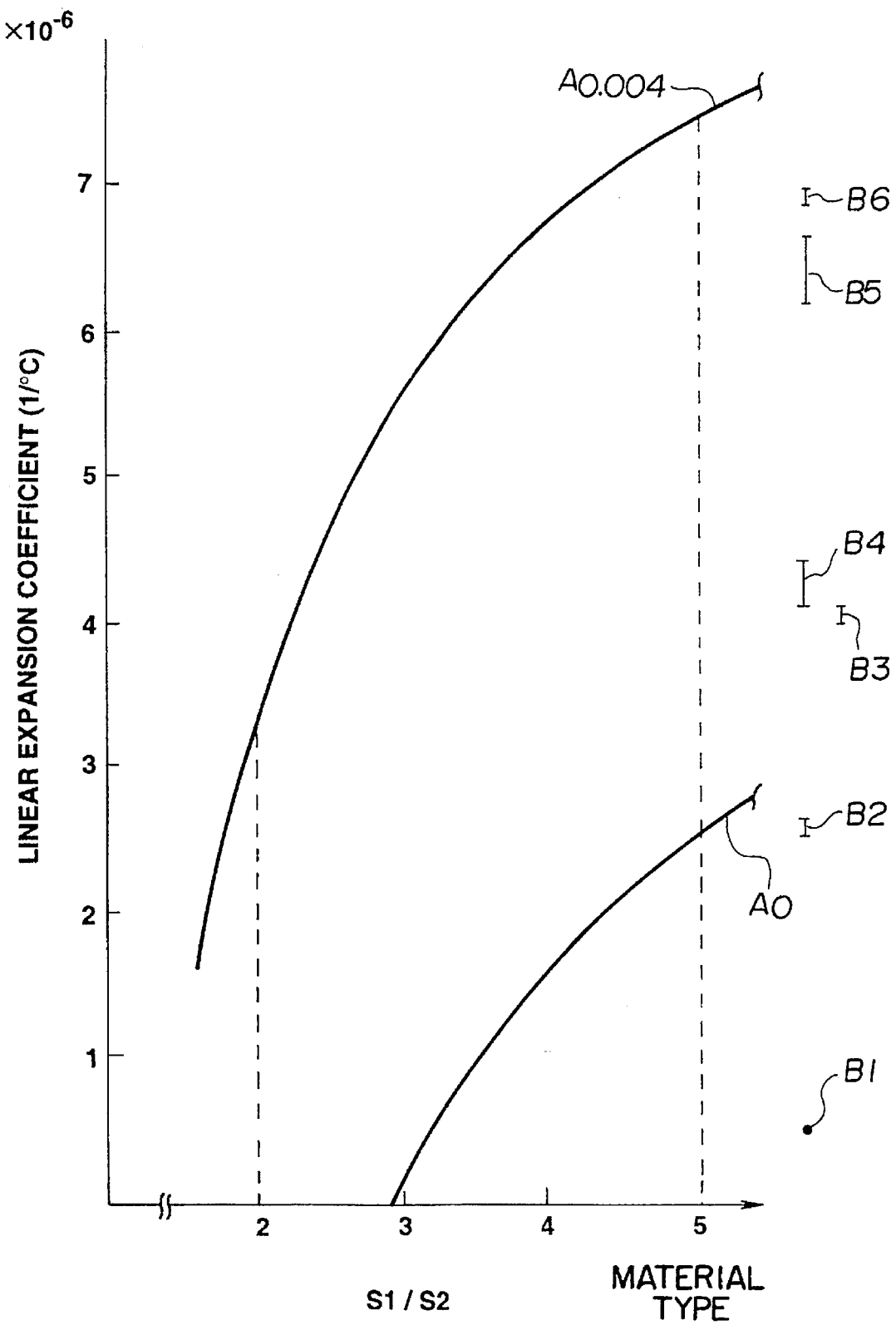
FIG. 2 is a graph showing the linear expansion coefficient plotted against the parameter ratio S1/S2 relating to the distances of the rotary magnetic head device and the materials having such linear expansion coefficients.
Figure 3:
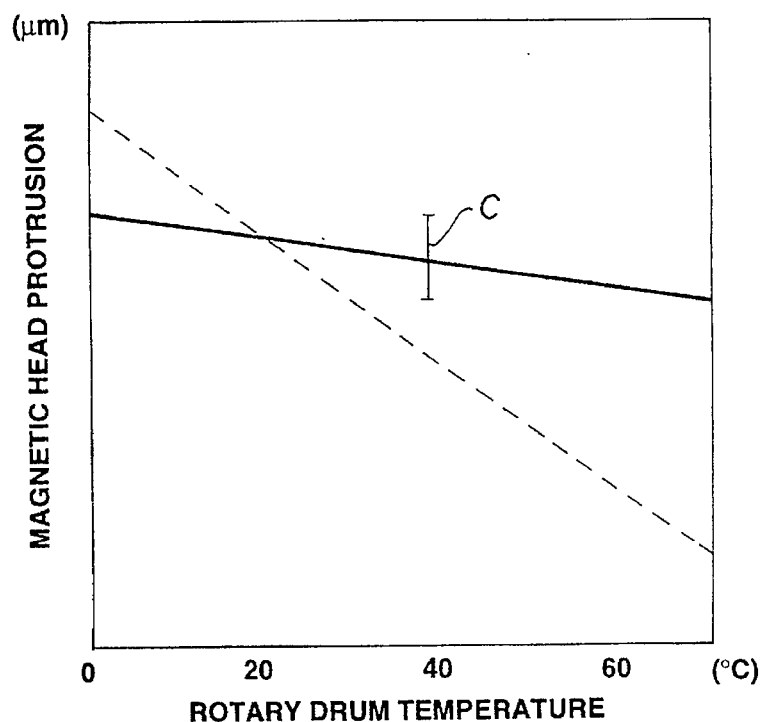
FIG. 3 is a graph showing the amount of protrusion of the magnetic head against changes in temperature of the rotary drum within the specified range in the graph.
Figure 4:
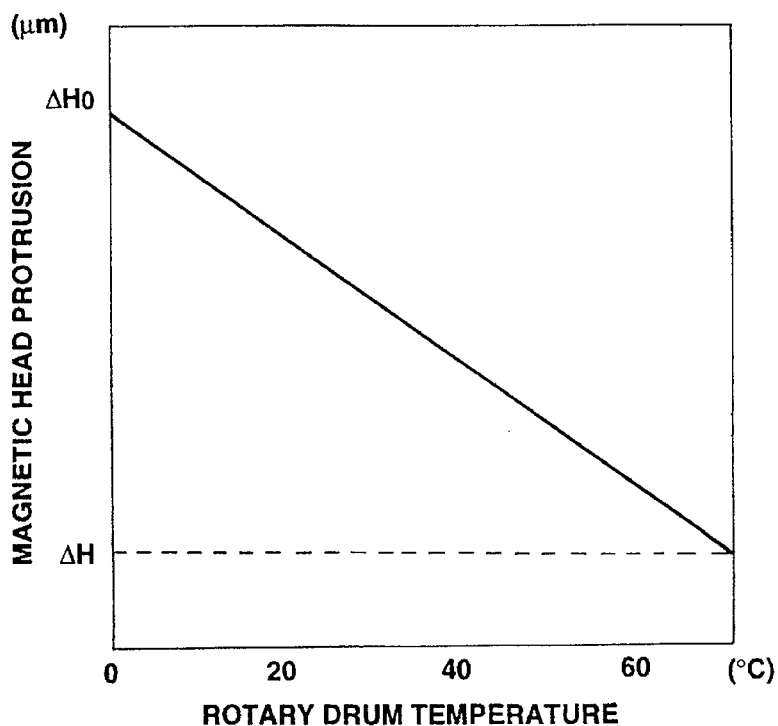
FIG. 4 is a graph showing the amount of protrusion of the magnetic head against changes in temperature of a conventional rotary drum.
Figure 5:
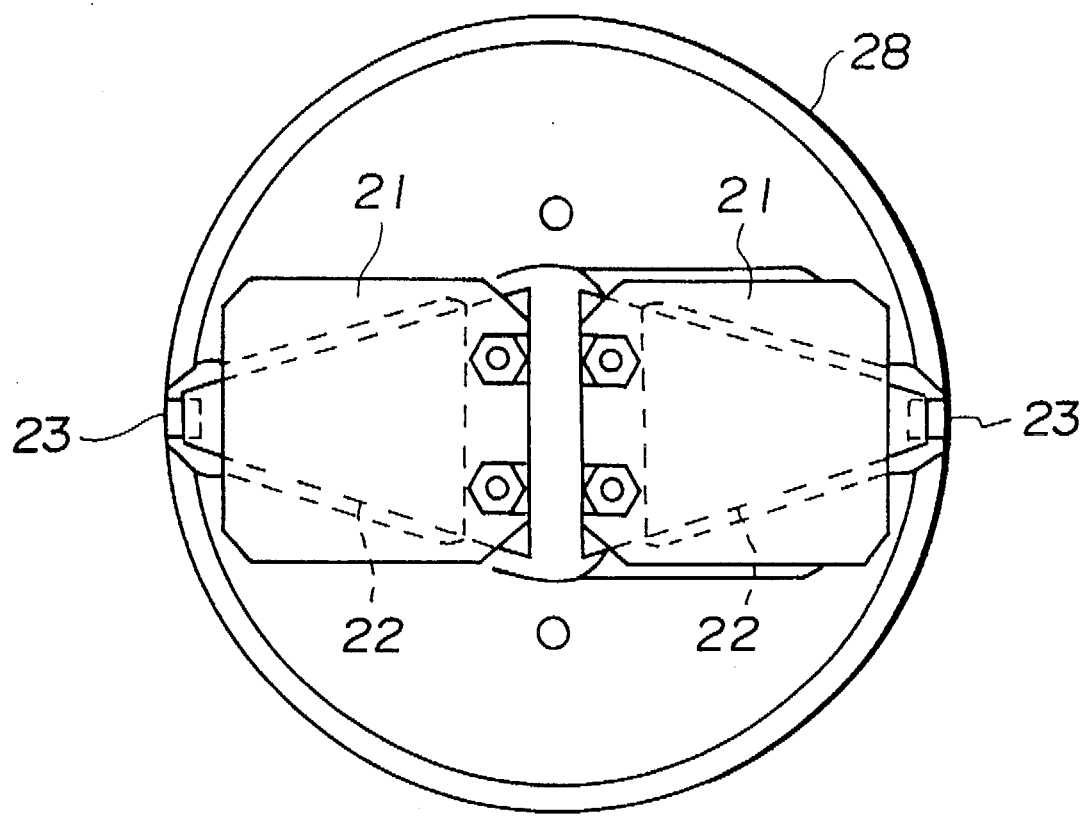
FIG. 5 is a plan view showing a known prior arrangement of a rotary magnetic head device, as similarly viewed from the reverse surface, with a rotary magnetic head device having a rotary drum reduced in size.

Referring to the drawings as seen in FIGS. 1 to 3, a preferred embodiment of a rotary magnetic head device according to the present invention relative to the related art shown in FIG. 5 will be explained in detail. The present embodiment is directed to a magnetic head device loaded on a video tape recorder so as to be adjusted in its position during a special replay mode such as a fast feed or a slow to still replay.

As seen in FIGS. 1(a) and 1(b), a rotary magnetic head device according to the invention of the present embodiment includes an electromechanical transducer element 2 supported in a substantially cantilevered manner by having its fixed proximal end secured to a head base 1, a magnetic head 3 mounted on the free distal end of the electromechanical transducer element 2, and a sensor 4 mounted between the proximal end and the distal end of the electromechanical transducer element 2 for detecting the amount of displacement of the magnetic head 3, as shown for example in FIG. 1. A control circuit (not shown) is provided for controlling the amount of displacement of the magnetic head 3 responsive to the output signal of the sensor 4.

The plan view of FIG. 1(a) shows, from a reverse side, the rotary magnetic head device according to the invention when mounted on a rotary drum 8. The head base 1 is formed as a substantially flat rectangular plate and is structurally adapted for supporting the electromechanical transducer element 2 in a cantilevered fashion by a raised portion 10 at its end. The middle portion of the head base 1 has a recess 11 in order to prevent the electromechanical transducer element 2 from being in contact with the head base 1 at the time of displacement of the electromechanical transducer element 2.

The electromechanical transducer element 2 is formed by, for example, a bimorph element, and causes a magnetic gap of the magnetic head 3 at the distal end thereof to follow a desired magnetic track. The piezoelectric bimorph element includes a pair of piezoelectric ceramic elements having electrodes formed on both sides by silk printing or baking. These elements are polarized to opposite polarities and cemented to each other with a shim located between the ceramic elements. The materials of the piezoelectric ceramics are selected with consideration of their linear expansion coefficients with changes in temperature. These materials are specifically discussed hereinbelow.

When a pre-set voltage is applied to the above-described piezoelectric bimorph element, an electrical field is applied to one of the piezoelectric ceramic elements from one to the other of the electrodes on both sides thereof in an opposite direction to the direction of polarization, so that the element is expanded outwards, while the other of the piezoelectric ceramic elements is contracted inwards, under the so-called piezoelectric effect. As a result, the piezoelectric bimorph element is deformed along the thickness in an amount which is changed with the magnitude of the applied electrical field. If the electrical field is applied in the opposite direction, the direction of deformation along the thickness is reversed.

The above-described electromechanical transducer element 2 is formed as a substantially planar trapezoid and having a bottom, with a broader width in vertical cross-section, supported in a cantilevered fashion on the raised portion 10 of the head base 1, with a spacer, not shown, in-between, as shown in a cross-sectional view taken along line A—A' of FIG. 1(a). The electromechanical transducer element 2 is sandwiched between the head base 1 and an insulating plate 5 and is secured by a pair of set screws 6a, 6b and nuts 7a, 7b.

The head base 1 is secured to a rotary drum 8 at an area offset from the electromechanical transducer element 2, that is at an area adjacent to the outer periphery of the rotary drum 8. The head base 1 has a through-hole near the outer periphery of the rotary drum 8. The rotary drum has a tapped through-hole in register with the through-hole in the head base 1. The head base 1 is secured to the rotary drum 8 by a pair of set screws 9a, 9b at a distance S1 from the set screws 6a, 6b via spacers 12, 12 having through-holes and openings in register with those of the head base 1 and the rotary drum 8.

By securing the head base 1 to the rotary drum 8 in the position shown, a sufficient amount of elastic deformation may be maintained, so that the rotary drum of a reduced size may be secured to the rotary drum despite the head base being unchanged in size.

The magnetic head 3 is employed for recording information signals on a magnetic tape or reproducing information signals from the magnetic tape. The magnetic head 3 has a magnetic core of soft magnetic material, such as magnetic ferrite, secured or cemented to the head by way of a gap spacer. A magnetic gap operating as a recording and/or reproducing gap is provided between opposed surfaces facing each other. The magnetic gap 3 is provided at the distal ends of upper and lower electromechanical transducer elements for connecting them together.

The sensor 4 is comprised of a strain gauge which changes its resistance in response to the amount of displacement of the electromechanical transducer element 2, i.e., that of the magnetic head 3. The sensor 4 is bonded with an adhesive to a middle part of the electromechanical transducer element 2 where the electromechanical transducer element 2 may be oscillated with a larger amplitude. Although only one sensor is shown, two sensors of the same construction may be provided on both sides of the electromechanical transducer element 2. An output of the sensor 4 is transmitted to a control circuit, not shown, by a flexible wiring substrate, also not shown.

The control circuit controls the amount of displacement of the electromechanical transducer element 2 responsive to an output signal of the sensor 4. Although not shown, the control circuit includes a displacement amount detection circuit for detecting the output signal of the sensor 4 and a bimorph driving circuit for applying a pre-set voltage to the electromechanical transducer element 2. The control circuit thus detects the amount of displacement in the form of the bending of the electromechanical transducer element 2 produced by the sensor 4, by the displacement amount detection circuit, as a variation of an extremely small voltage, and causes the output detection signal to be fed back to the bimorph driving circuit by way of a performing position adjustment for placing the magnetic head at an optimum position relative to the recording track. Consequently, the magnetic head 3 may be caused to follow the pre-set recording track of the magnetic tape during variable speed reproduction in the video tape recorder by way of performing tracking control.

The magnetic head is protruded in differing quantities with changes in temperature, as discussed above. Such a change in the protruded amount of the magnetic head induces poor abutment of the magnetic head against the magnetic tape as the recording medium. For example, under higher temperatures, the magnetic head is receded relative to the rotary drum, so that the magnetic head is contacted to a lesser extent with the magnetic tape. Conversely, under lower temperatures, the magnetic head is projected relative to the rotary drum to cause damages to the magnetic tape under the effect of vibrations or the like.

According to the present invention, the head base 1 and the electromechanical transducer element 2 are formed of materials the linear expansion coefficients of which are substantially in the same numerical range, for overcoming the above deficiency. It becomes necessary to define the range of the linear expansion coefficients of the materials in use. For defining the range, calculations are performed using the distances between pre-set points of the components as parameters S1 to S3 as shown in FIGS. 1(a), 1(b) and 1(c). Of these parameters S1 to S3, the parameter S1 is the distance between the mounting center position of the head base 1 and the electromechanical transducer element 2; that is, the set screws 6a or 6b, and the mounting center position of the head base 1 to the rotary drum 8, that is the set screws 9a or 9b. The parameter S2 is the distance between the mounting center position of the head base 1 to the rotary drum 8 and the outer periphery of the rotary drum 8, while the parameter S3 is the distance between the mounting center position between the head base 1 and the electromechanical transducer element 2 and the distal end of the electromechanical transducer element 2.

The amount of protrusion $\Delta H$, which is changed in dependence upon changes in temperature, is given by $$\Delta H = \{S3 \times \alpha - (S1 + S2) \times \alpha\} \times \Delta T \qquad (2)$$

as indicated in the equation (1). In effect, if the head base 1 and the electromechanical transducer element 2 are formed of a ceramic material having substantially the same linear expansion coefficients, such as titanium lead zirconate ($PbZrO_3 + PbTiO_3$), and the head base 1 is secured to near the outer periphery of the rotary drum 8, only the difference due to the distance between the components is reflected as different protruded amounts, so that the amount of protrusion as changed with the temperature may be reduced.

If the linear expansion coefficient of the members employed is taken into account, the equation (3)

$$\Delta H = \{S3 \times \alpha_3 - (S1 \times \alpha_1 + S2 \times \alpha_2)\} \times \alpha T \qquad (3)$$

is obtained, in which S1 to S3 are the above parameters and $\alpha_1$, $\alpha_2$, $\alpha_3$ denote linear expansion coefficients of the materials employed. That is, if an approximation of $S3 = S1 + S2$ holds, the above equation (3) becomes $$\begin{aligned}\Delta H &= \{(S1 + S2) \times \alpha_3 - (S1 \times \alpha_1 + S2 \times \alpha_2)\} \times \Delta T \qquad (4)\\ &= \{S1 \times (\alpha_3 - \alpha_1) + S2 \times (\alpha_3 - \alpha_2)\} \times \Delta T\end{aligned}$$

In order for the amount of protrusion to be zero despite changes in temperature, the equation (4) is modified and the ratio of the distance S1 to the distance S2 is represented by $$S1/S2 = (\alpha_2 - \alpha_3)/(\alpha_3 - \alpha_1) \qquad (5)$$

The linear expansion coefficients $\alpha_1$, $\alpha_3$ are those of the head base 1 and the electromechanical transducer element 2, respectively. Since the actual ratio S1/S2 is in a range of 2 to 5, the linear expansion coefficient satisfying the condition may be found using the equation (5).

If the member constituting the rotary drum 8 is formed of aluminum, the value of the linear expansion coefficient $\alpha_2$ is $23.6 \times 10^{-6}$ (1/–° C.). The piezoelectric ceramic material of the electromechanical transducer element 2 is titanium lead zirconate ($PbZrO_3+PbTiO_3$) having the linear expansion coefficient $\alpha_3$ of $6\times10^{-6}$ (1/° C.). Substituting these values into the equation (5) and calculating, the equation (5) becomes $$(6.0\times10^{-6}-\alpha_1)\ S1/S2=(23.6-6.0)\times10^{-6}/ \qquad (6)$$

so that the linear expansion coefficient $\alpha_1$ within the range of the ratio S1/S2 may be calculated. By employing the calculated linear expansion coefficient, the amount of protrusion of the magnetic head 3 caused by changes in temperature may be reduced to zero.

FIG. 2 shows a curve $A_o$ indicating such range. The linear expansion coefficient of the head base 1 reducing the amount of protrusion ΔH of the head when the head base 1 is secured to the vicinity of the outer periphery of the rotary drum 8 may be found. The material which reduces the amount of protrusion to zero includes ceramics B1 and B2 shown for example in FIG. 2. The ceramic B1 is cordierite ($2MgO\cdot2Al_2O_3$) while the ceramic B2 is silicon nitride ($SiN_4$).

Since the ratio S1/S2 of the rotary drum of a video tape recorder in current use is in a range of 2 to 5 as mentioned above, it is practically desirable that the change in the amount of protrusion ΔH' of the magnetic head per 1 mm as a unit value of the distance S3 of the electromechanical transducer element 2 be not more than 0.004 (μm/° C.). With such condition being taken into account, the amount of protrusion ΔH of the magnetic head 3 is not more than 1 μm for the temperature change of 10° C. and for the distance S3 of 25 mm. The relation between the linear expansion coefficient and the ratio S1/S2 satisfying the above condition is represented by a curve $A_{0.004}$ in FIG. 7. In connection with the curve $A_{0.004}$ in FIG. 7, it suffices to use a material having the linear expansion coefficient of not more than the curve $A_{0.004}$ for the range of S1/S2.

Among the ceramics and alloys satisfying such condition are ceramic materials B3, B4 and B6 and an alloy B5. Specifically, the ceramic material B3 is silicon carbide (SIC) or so-called carborundum. The ceramic material B4 is mullite ($3Al_2O_3\cdot2SiO_2$). The ceramic material B6 is alumina ($Al_2O_3$). The alloy B5 is MoCu based sintered alloy which is produced by impregnating copper in molybdenum particles and sintering the resulting mass.

By using the members of such material in combination, the amount of protrusion of the practical magnetic head may be comprised within a range of a bar C for rotary drum temperature in the range of 0° C. to 60° C. As to the range of the bar C, as seen in FIG. 3 the conventional range of 40 μm at or near the maximum and usually 25 to 27 μm for the ratio S1/S2=2 and the distance S3 of 25 mm may be comprised within a range of 5 μm.

With the above constitution of the present invention, the linear expansion coefficients of the members used as the head base and the electromechanical transducer element is set so as to be in the same range for suppressing changes in the amount of protrusion produced in the head base and the linear expansion coefficient $\alpha_2$. This assures stable abutment between the magnetic head and the magnetic tape. As for the rotary magnetic head device, accidents such as injuries to the magnetic tape by the protruded magnetic head or deterioration in performance due to insufficient contact between the magnetic head and the magnetic tape may be prevented from occurring.

The above-described embodiments are not limitations on the present invention. If the rotary drum is of a standard size or larger, the rotary magnetic head device may be fixed near the inner periphery of the rotary drum. The material of the members in use are not limited to those given above and, of course, those materials which satisfy the above conditions and the linear expansion coefficients of which are within the above specified range may be employed.

With the rotary magnetic head device according to the present invention, the members of the head base and the electromechanical transducer element are substantially of the same linear expansion coefficient in order to suppress the amount of protrusion produced in the head base and the electromechanical transducer element and in order to assure stable abutment between the magnetic head and the magnetic tape. Thus the rotary magnetic head device may be safeguarded against accidents such as injuries to the magnetic tape by the protruded magnetic head or deterioration in performance due to insufficient contact between the magnetic head and the magnetic tape.

In addition, the fixed position of the head base is in the vicinity of the outer periphery of the rotary drum in order to avoid fixing on a motor axis to assure a pre-set length, that is a sufficient amount of elastic deformation for assuring stable tracking of the recording track by the magnetic head.

Furthermore, the head base and the electromechanical transducer element are formed of ceramics or alloys having substantially the same linear expansion coefficient for decreasing the amount of protrusion of the magnetic head due to changes in temperature to e.g. 0.004 μm/C.

What is claimed is:

1. A rotary magnetic head device comprising
   an electromechanical transducer element having a proximal end secured to a raised portion of a head base within a rotary drum,
   a magnetic head provided at a distal end of the electromechanical transducer element which protrudes above an outer surface of said rotary drum, wherein said electromechanical transducer element displaces the magnetic head in response to a driving electrical voltage applied to said electromechanical transducer element, and
   a sensor provided between the proximal end and the distal end of the electromechanical transducer element for detecting the amount of displacement of the magnetic head,
   wherein the head base, the rotary drum and the electromechanical transducer element are formed of materials wherein each material has a linear expansion coefficient such that the protrusion of the magnetic head above the outer surface of the rotary drum does not change by more than 0.004 μm for every change in temperature of one degree Celsius.

2. The rotary magnetic head device as claimed in claim 1 wherein the head base is secured to the rotary drum in the vicinity of the outer periphery of the rotary drum.

3. The rotary magnetic head device as claimed in claim 1 wherein the head base and the electromechanical transducer element are each formed of ceramic or alloy.

4. The rotary magnetic head device as claimed in claim 1 wherein the head base and the electromechanical transducer element are each formed of alumina, MoCu-based sintered alloy, mullite, silicon carbide, cordierite, silicon nitride or titanium lead zirconate.

5. The rotary magnetic head device as claimed in claim 1 wherein S1 is a distance between a mounting center position between the head base and the electromechanical transducer element and the mounting center position of the head base to the rotary drum; S2 is the distance between the mounting center position of the head base to the rotary drum and the outer periphery of the rotary drum; and S3 is the distance between the mounting center position between the head base and the electromechanical transducer element and the distal end of the electromechanical transducer element, where S3 is approximately equal to S1 plus S2, and S1/S2 is in a range of approximately 2 to 5.

6. The rotary magnetic head device as claimed in claim 5 wherein $\alpha_1$ is a linear expansion coefficient of the head base, $\alpha_2$ is a linear expansion coefficient of the rotary drum, and $\alpha_3$ is a linear expansion coefficient of the electromechanical transducer; and the head base, rotary drum and electromechanical transducer are made from materials such that $(\alpha_2-\alpha_3)/(\alpha_3-\alpha_1)=x$, where x is in the range of approximately 2 to 5.

7. The rotary magnetic head device as claimed in claim 1 wherein, the rotary drum is formed of aluminum, the electromechanical transducer is formed of titanium lead zirconate, and the head base is formed of cordierite or silicon nitride.

8. A rotary magnetic head device comprising:
a head base having a linear expansion coefficient, $\alpha_1$;
a rotary drum having a linear expansion coefficient, $\alpha_2$, wherein said head base is secured to said rotary drum;
an electromechanical transducer element having a linear expansion coefficient, $\alpha_3$, and supported in a substantially cantilevered manner by having a fixed proximal end secured to said head base;
a magnetic head mounted on a free distal end of said transducer element; and
a sensor mounted between the proximal end and the distal end of the electromechanical transducer element for detecting an amount of displacement of the magnetic head,
wherein the head base, rotary drum and electromechanical transducer are made from materials such that $(\alpha_2-\alpha_3)/(\alpha_3-\alpha_1)=x$, where x is in the range of approximately 2 to 5.

9. The rotary magnetic head device as claimed in claim 8 wherein the head base is secured to the rotary drum in the vicinity of the outer periphery of the rotary drum.

10. The rotary magnetic head device as claimed in claim 8 wherein the head base and the electromechanical transducer element are each formed of ceramic or alloy.

11. The rotary magnetic head device as claimed in claim 8 wherein the head base and the electromechanical transducer element are each formed of alumina, MoCu-based sintered alloy, mullite, silicon carbide, cordierite, silicon nitride or titanium lead zirconate.

12. The rotary magnetic head device as claimed in claim 8 wherein S1 is a distance between a mounting center position between the head base and the electromechanical transducer element and the mounting center position of the head base to the rotary drum; S2 is the distance between the mounting center position of the head base to the rotary drum and the outer periphery of the rotary drum; and S3 is the distance between the mounting center position between the head base and the electromechanical transducer element and the distal end of the electromechanical transducer element, where S3 is approximately equal to S1 plus S2, and S1/S2 is in a range of approximately 2 to 5.

13. The rotary magnetic head device as claimed in claim 8 wherein the head base, the electromechanical transducer element, and the rotary drum have linear expansion coefficients such that a protrusion of the magnetic head above the outer surface of the rotary drum does not change by more than 0.004 µm for every change in temperature of one degree Celsius.

14. A rotary magnetic head device comprising:
an electromechanical transducer element supported in substantially a cantilevered fashion by having a proximal end secured to a rotary drum at a raised portion of a head base as a mounting member, said head base formed as a substantially flat rectangular plate and structurally adapted for supporting the electromechanical transducer element in a cantilevered portion by said raised portion, a middle portion of said head base having a recess to prevent the transducer element from being in contact with the head base at the time of displacement of the transducer element, said electromechanical transducer element being formed as a substantially planar trapezoid and having a bottom supported in a cantilevered fashion on the raised portion of the head base,
a magnetic head provided at the distal end of the electromechanical transducer element for displacing the magnetic head in response to a driving electrical voltage applied to said electromechanical transducer element, and
a sensor provided between the proximal end and the distal end of the electromechanical transducer element for detecting the amount of displacement of the magnetic head.

15. A rotary magnetic head device comprising:
an electromechanical transducer element supported in substantially a cantilevered fashion by having a proximal end secured to a raised portion of a head base within a rotary drum;
a magnetic head provided at a distal end of the electromechanical transducer element, wherein the electromechanical transducer element displaces the magnetic head in response to a driving electrical voltage applied to said electromechanical transducer element; and
a sensor provided between the proximal end and the distal end of the electromechanical transducer element for detecting the amount of displacement of the magnetic head;
wherein:
S1 is a distance between a mounting center position between the head base and the electromechanical transducer element and the mounting center position of the head base to the rotary drum;
S2 is the distance between the mounting center position of the head base to the rotary drum and the outer periphery of the rotary drum;
S3 is the distance between the mounting center position between the head base and the electromechanical transducer element and the distal end of the electromechanical transducer element; and
a change in the protrusion, $\Delta H$, of said transducer element relative to said head base in response to a change in temperature, $\Delta T$, is given by the equation $$\Delta H = \{S3 \times \alpha_3 - (S1 \times \alpha_1 + S2 \times \alpha_2)\} \times \alpha T$$

wherein $\alpha_1$ is a linear expansion coefficient of the head base, $\alpha_2$ is a linear expansion coefficient of the rotary drum, and $\alpha_3$ is a linear expansion coefficient of the electromechanical transducer.

16. A rotary magnetic head device comprising:
an electromechanical transducer element supported in substantially a cantilevered fashion by having a proximal end secured to a raised portion of a head base within a rotary drum;

a magnetic head provided at a distal end of the electromechanical transducer element which protrudes above an outer surface of said rotary drum, wherein said electromechanical transducer element displaces the magnetic head in response to a driving electrical voltage applied to said electromechanical transducer element; and a sensor provided between the proximal end and the distal end of the electromechanical transducer element for detecting the amount of displacement of the magnetic head;

wherein:

S1 is a distance between a mounting center position between the head base and the electromechanical transducer element and the mounting center position of the head base to the rotary drum;

S2 is the distance between the mounting center position of the head base to the rotary drum and the outer periphery of the rotary drum;

S3 is the distance between the mounting center position between the head base and the electromechanical transducer element and the distal end of the electromechanical transducer element; and S3 is approximately equal to S1 plus S2, and S1/S2 is a range of approximately 2 to 5.

* * * * *